(12) United States Patent
Chiang et al.

(10) Patent No.: US 6,767,070 B1
(45) Date of Patent: Jul. 27, 2004

(54) BICYCLE WHEEL RIMS

(75) Inventors: Cheng-Hsun Chiang, Ta-Li (TW); Ko-Jan Tsai, Ta-Li (TW)

(73) Assignee: Tien Hsin Industries Co., Ltd., Taichung Hsien (TW)

(*) Notice: Subject to any disclaimer, the term of this patent is extended or adjusted under 35 U.S.C. 154(b) by 0 days.

(21) Appl. No.: 10/428,819

(22) Filed: May 5, 2003

(51) Int. Cl.[7] .................. B60B 21/00; B60B 25/00; B60B 1/02
(52) U.S. Cl. ............... 301/95.11; 301/95.101; 301/58
(58) Field of Search .................. 301/55, 57–58, 301/73, 79, 95.101, 95.107, 95.11, 30, 31, 52

(56) References Cited

U.S. PATENT DOCUMENTS

| | | | | |
|---|---|---|---|---|
| 1,156,471 A | * | 10/1915 | Elliott | 301/52 |
| 1,195,066 A | * | 8/1916 | Morton | 301/52 |
| 1,312,176 A | * | 8/1919 | Hecht | 301/52 |
| 1,872,079 A | * | 8/1932 | Harris | 301/52 |
| 4,938,540 A | * | 7/1990 | Sacks | 301/99 |
| 5,470,133 A | * | 11/1995 | Kuo et al. | 301/30 |
| 5,941,606 A | * | 8/1999 | Chen | 301/30 |
| 6,460,939 B1 | * | 10/2002 | Claes | 301/95.101 |

* cited by examiner

*Primary Examiner*—Russell D. Stormer
*Assistant Examiner*—Jason R. Bellinger
(74) *Attorney, Agent, or Firm*—Rosenberg, Klein & Lee

(57) ABSTRACT

A bicycle wheel rim includes a plurality of connectors each having a spoke engaging hole for connecting with a spoke, and two protrusions extend from two ends of each connector. A plurality of holes are defined through each protrusion and a plurality of loops extend through the holes of the connectors which are arranged as a circle. Each protrusion has a recess defined in an inside thereof so as to be engaged with a tire. The loops and the connectors are made by carbon fiber or compound material.

5 Claims, 11 Drawing Sheets

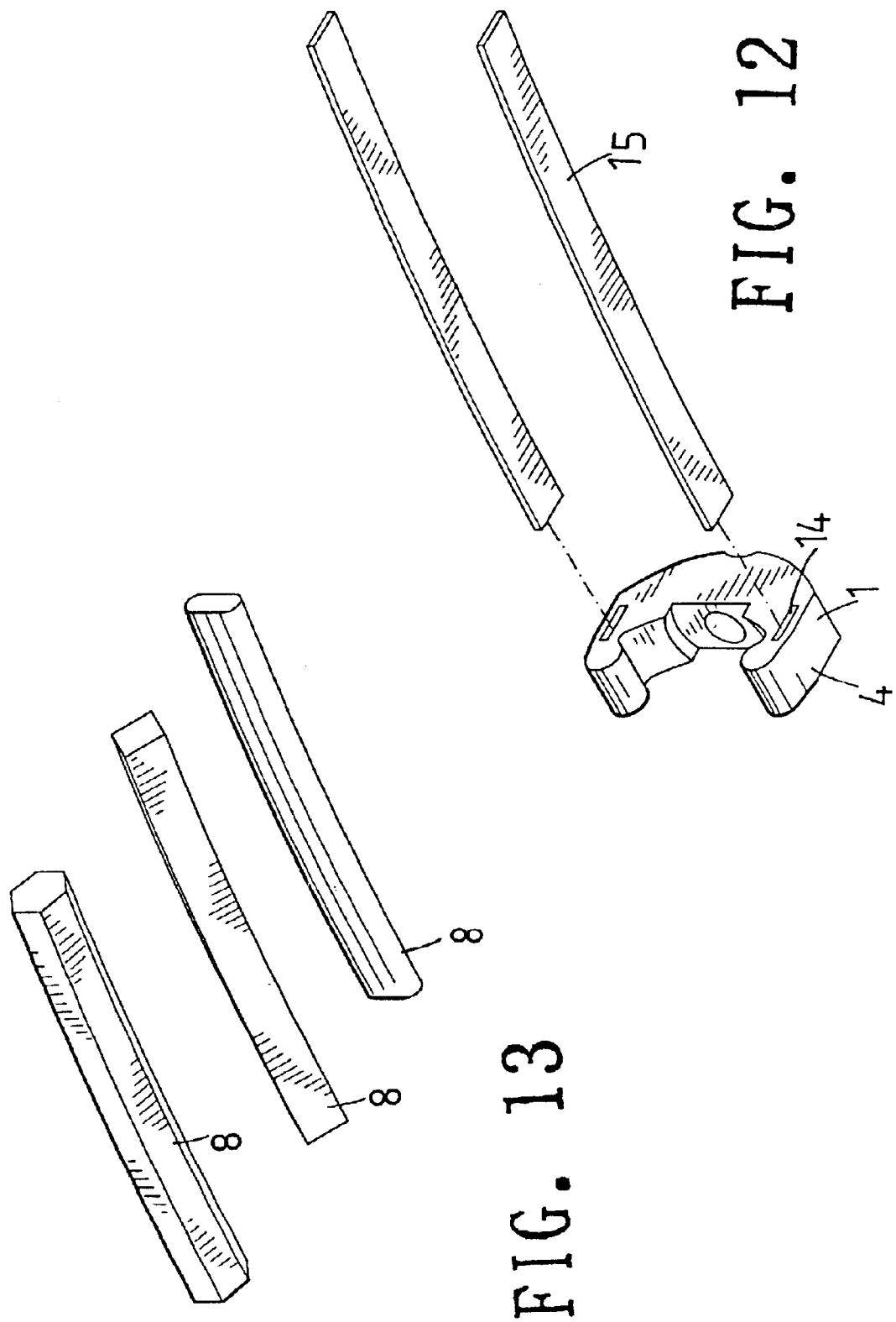

BICYCLE WHEEL RIMS

FIELD OF THE INVENTION

The present invention relates to a bicycle wheel rim which is composed of a plurality of connectors and carbon-fiber loops are connected between the connectors so as to form a light and durable rim.

BACKGROUND OF THE INVENTION

A conventional bicycle wheel rim generally made of metal such as steel or aluminum and tire is engaged to the rim. A plurality of spokes are connected to the rim and a hub of the wheel so as to maintain the rim in proper shape. The metal made rim is not satisfied by the customers because it is too heavy. Some rim manufacturers try to make the rim by carbon fiber which is light and durable, they make two semi-circular parts by carbon fiber and the two parts are then connected with each other to form a circular rim. The only difference is that the material is changed from metal to carbon fiber and not too much weight is saved. Furthermore, it is difficult to well connect the two parts so that the rim is less strong enough and the tire is easily to be disengaged from the rim when applied by an impact.

The present invention intends to provide a rim that is composed of a plurality of connections and loops are connected between the connectors. The connectors and the loops may both be made by carbon fiber.

SUMMARY OF THE INVENTION

In accordance with one aspect of the present invention, there is provided a bicycle wheel rim which comprises a plurality of connectors which are arranged as a circle and each have a spoke engaging hole so as to be engaged with a spoke. Two protrusions or flange extend from two ends of each connector and a plurality of holes are defined through each protrusion. A plurality of loops extend through the holes of the connectors and each protrusion has a recess defined in an inside thereof so as to be engaged with a tire.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 12 is an exploded view to show a fourth embodiment of the wheel rim of the present invention, and FIG. 13 shows the loops with different shapes of cross sections.

DETAILED DESCRIPTION OF THE PREFERRED EMBODIMENT

Figures 1, 2:
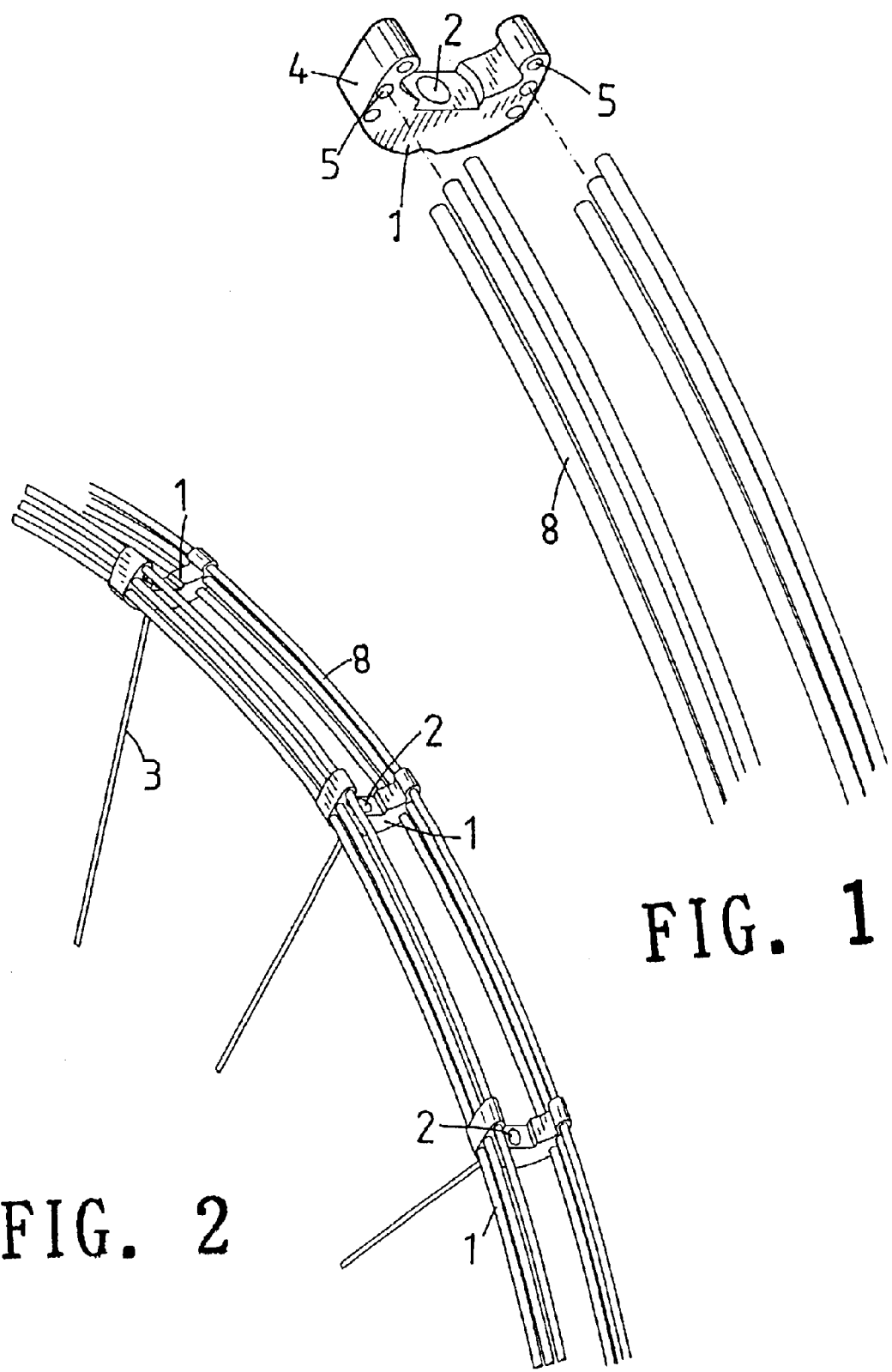
FIG. 1 is an exploded view to show a first embodiment of the wheel rim of the present invention.
FIG. 2 is a perspective view to show a part of the first embodiment of the wheel rim of the present invention.
Figure 3:
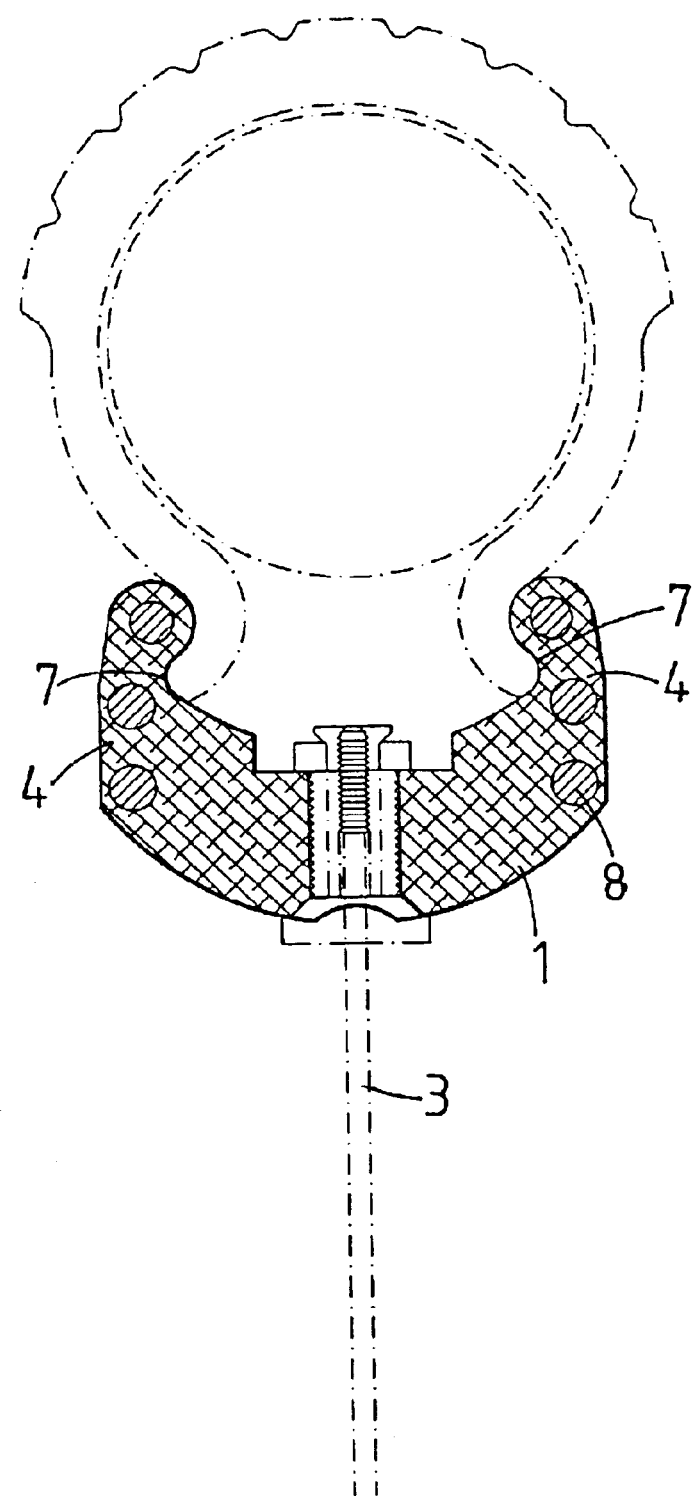
FIG. 3 is an end cross sectional view to show the first embodiment of the wheel rim of the present invention.

Referring to FIGS. 1 to 3 and 5, the bicycle wheel rim of the present invention comprises a plurality of connectors 1 each having a spoke engaging hole 2 defined therethrough so as to be engaged with a spoke 3, and the connectors 1 are arranged as a circle. Two protrusions or flanges 4 extend from two ends of each connector 1 and a plurality of holes 5 are defined through each protrusion of flanges 4. Each protrusion 4 has a recess 7 defined in an inside surface thereof so as to be engaged with a tire. A plurality of loops 8 extend through the holes 5 of the connectors 1. The loops 8 can be formed by connecting a plurality of strips. The connectors 1 and the loops 8 are both made by compound material such as carbon fiber.

Figure 4:
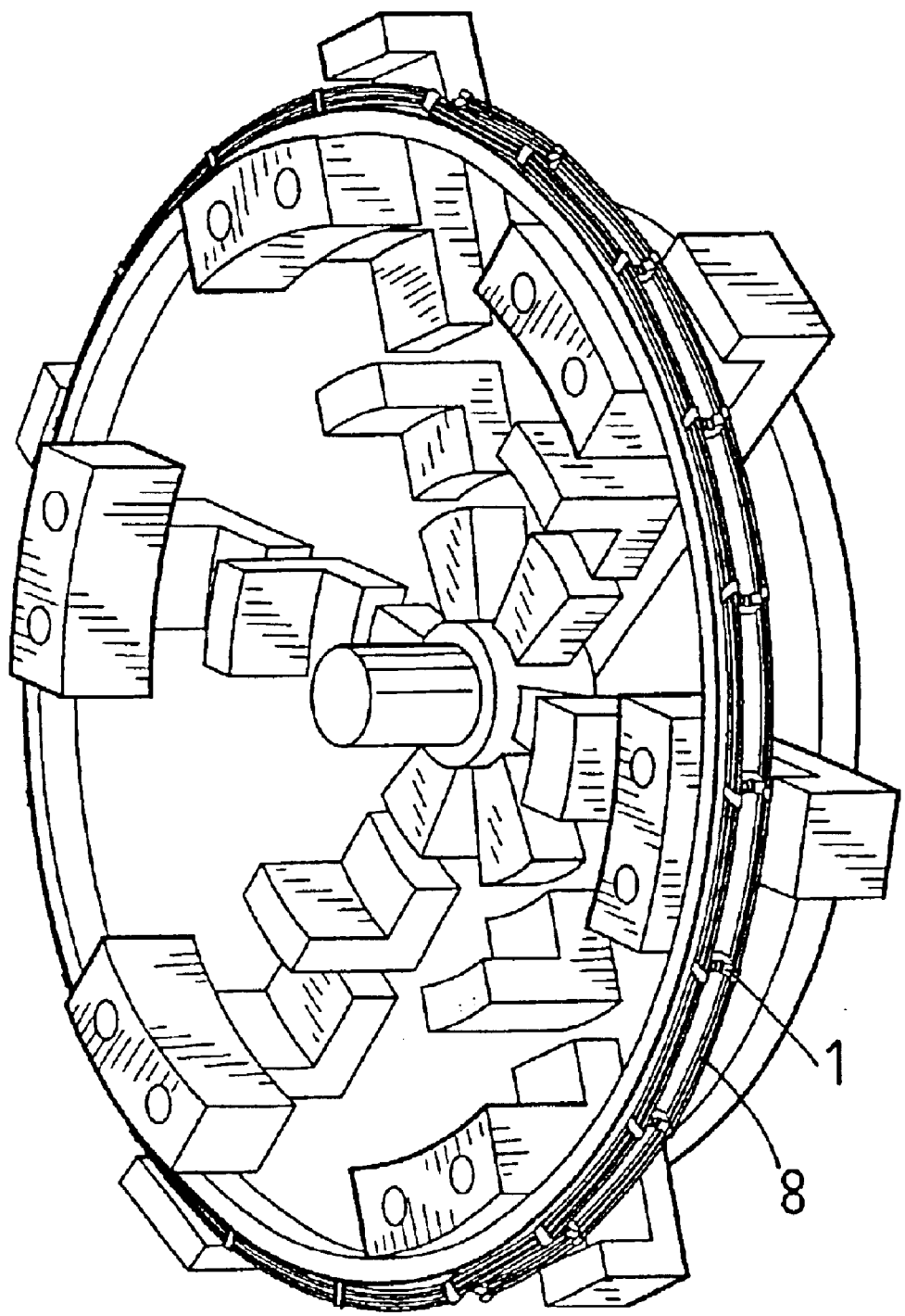
FIG. 4 shows a rim forming machine is used to make the first embodiment of the wheel rim of the present invention.
Figure 5:
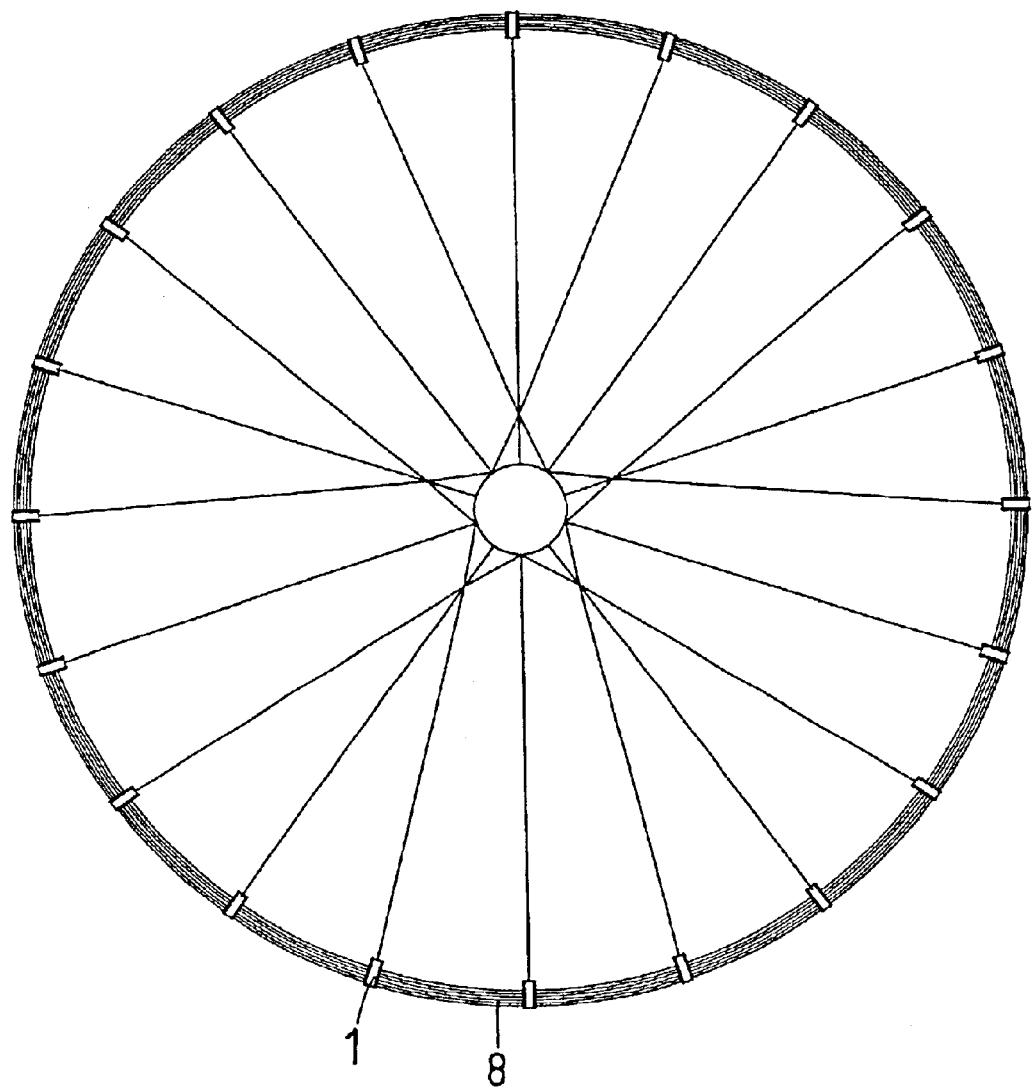
FIG. 5 is a side view to show the first embodiment of the wheel rim of the present invention.
Figure 6:
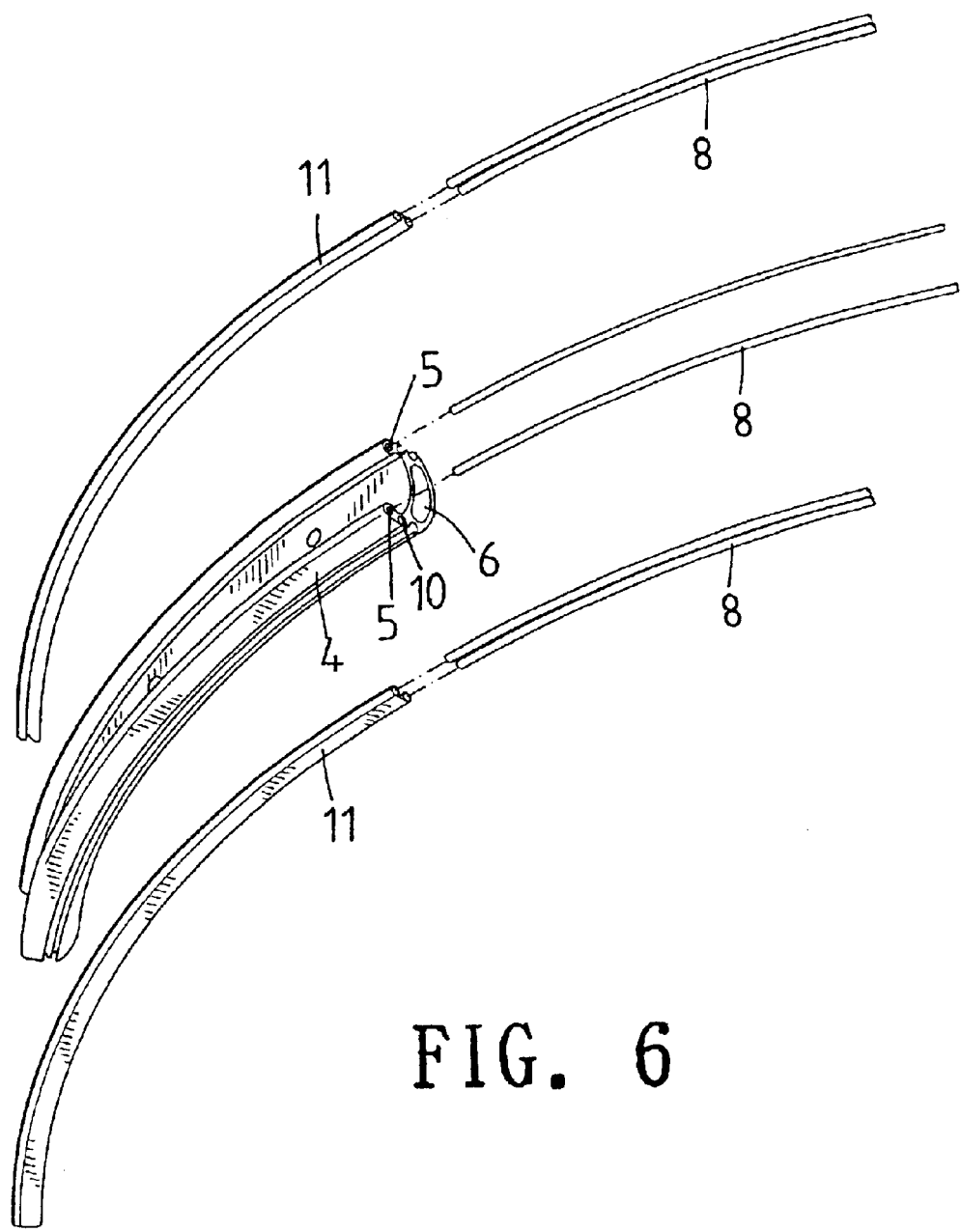
FIG. 6 is an exploded view to show a second embodiment of the wheel rim of the present invention.
Figure 7:
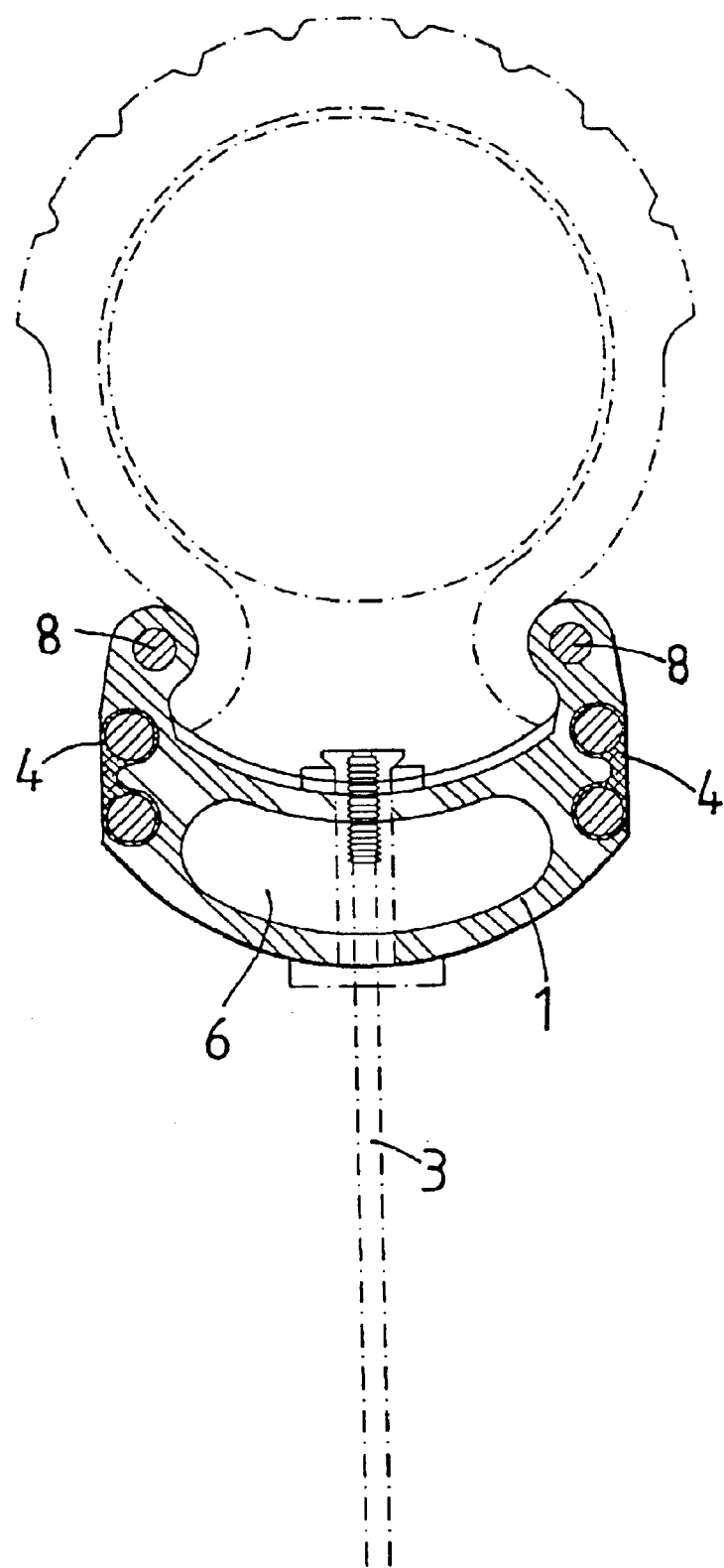
FIG. 7 is an end cross sectional view to show the second embodiment of the wheel rim of the present invention.
Figure 8:
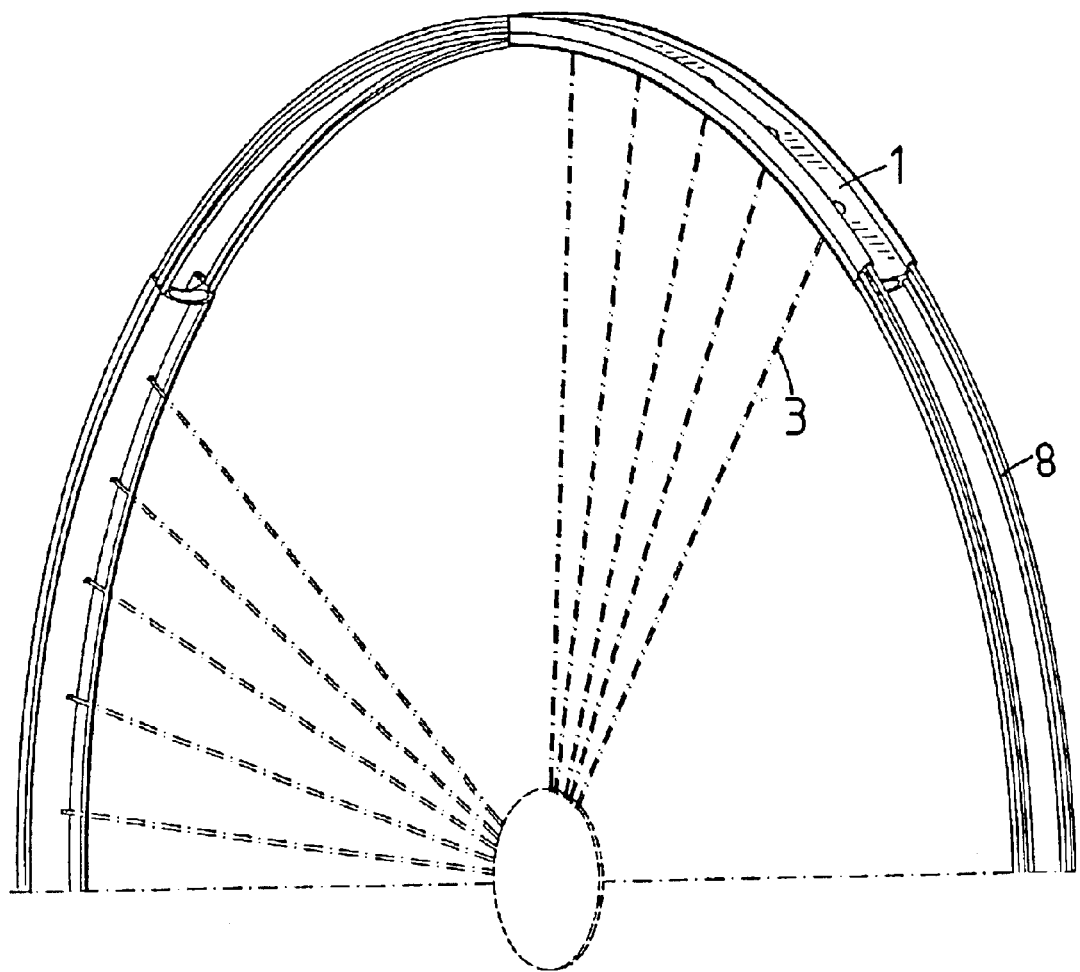
FIG. 8 is a perspective view to show a part of the second embodiment of the wheel rim of the present invention.
Figure 9:
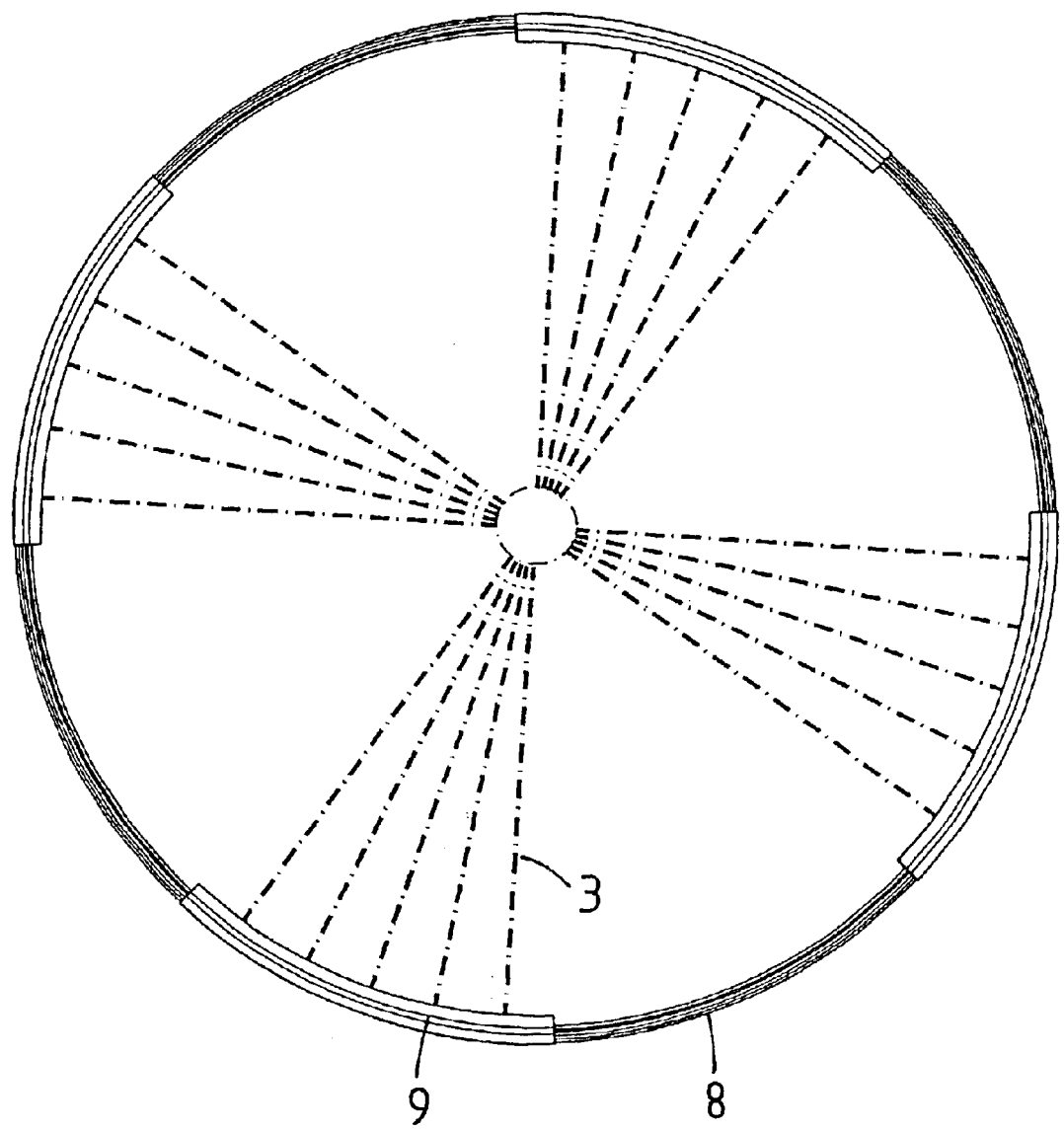
FIG. 9 is a side view to show a part of the second embodiment of the wheel rim of the present invention.

As shown in FIG. 4, a rim forming machine is used to make the rim and to position the connectors 1. The strips can also be connected to be loops in this procedure.

Figure 10:
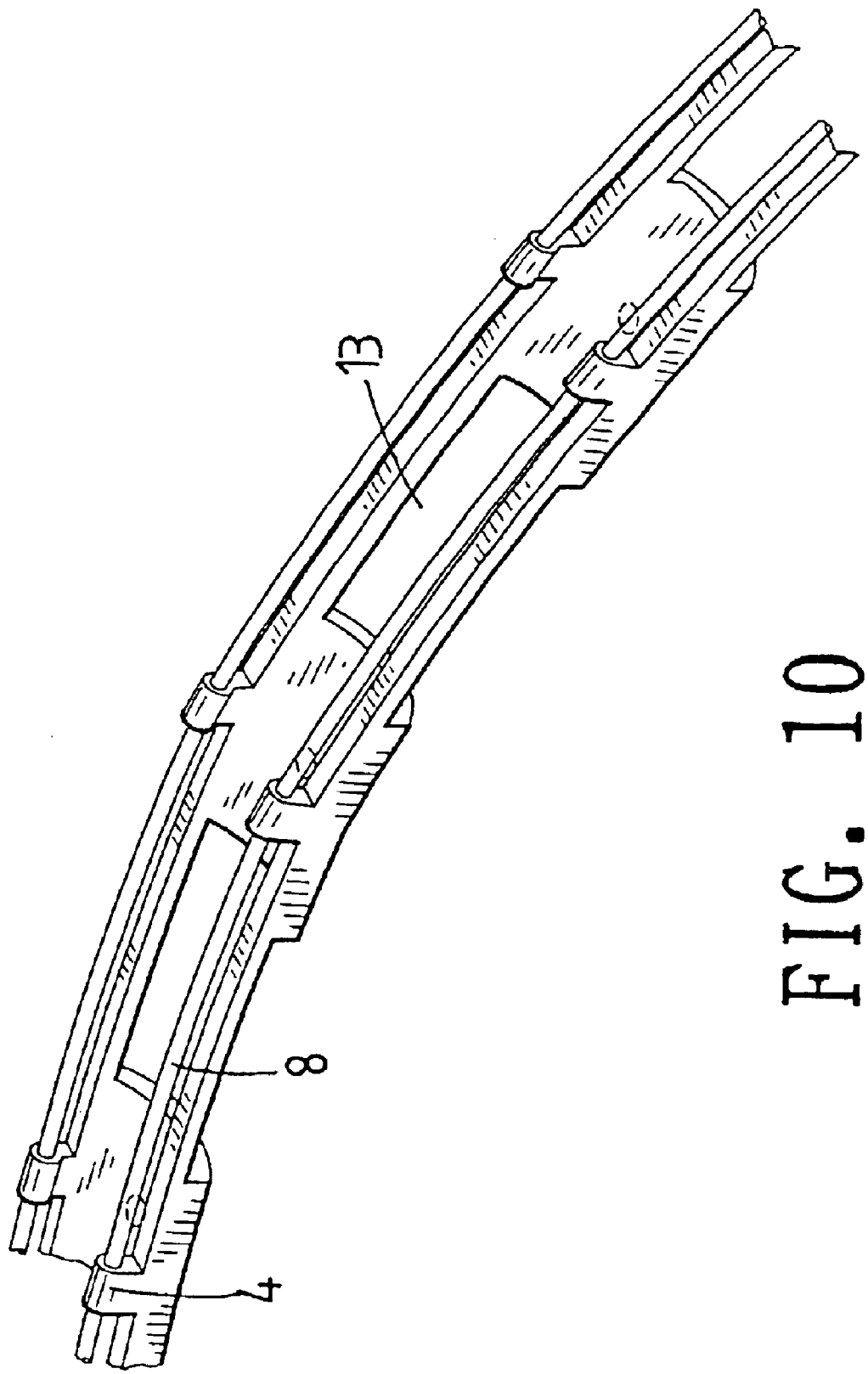
FIG. 10 is a perspective view to show a part of the third embodiment of the wheel rim of the present invention.
Figure 11:
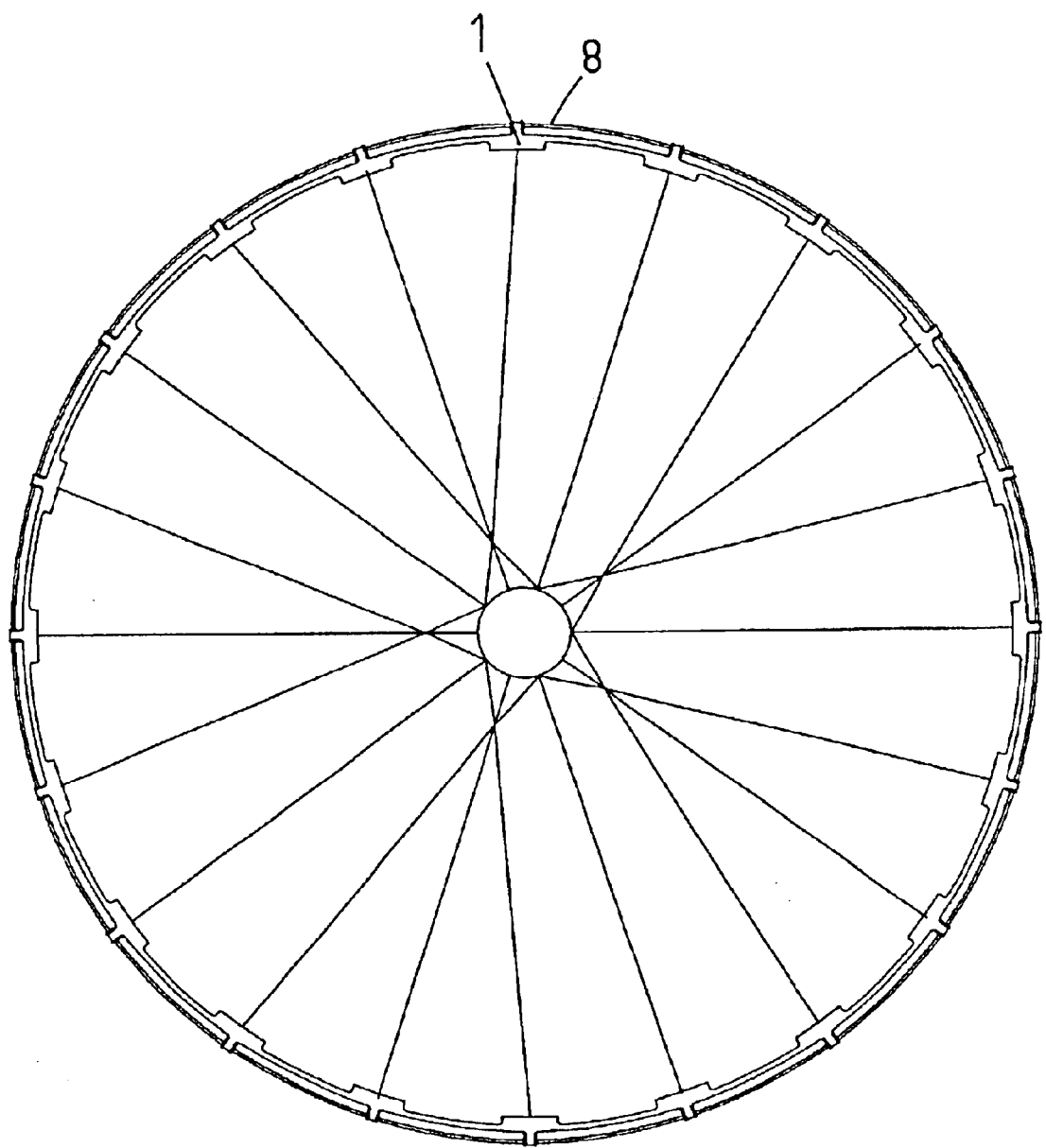
FIG. 11 is a side view to show the third embodiment of the wheel rim of the present invention.

Referring to FIGS. 6–9, the connectors 1 each have two side recesses 10 so as to receive two side members 11 therein. Each of the two side members 11 includes two passages. Two loops 8 extend through the passages of each side member 11. Each of the connectors 1 has a certain length and includes a hollow body 9 so as to reduce its weight. FIGS. 10 and 11 show that each of the connectors 1 includes an aperture 13 defined therethrough so as to reduce the weight.

FIG. 12 shows that the holes in the protrusions or flanges 4 can be rectangular holes 14 so as to receive the loops 15 which has a rectangular cross section. The shapes of cross section can be different as shown in FIG. 13.

The rim of the present invention has durable structure and very light in weight which meets the requirements of the modern bicycle wheel rims.

While we have shown and described the embodiment in accordance with the present invention, it should be clear to those skilled in the art that further embodiments may be made without departing from the scope of the present invention.

What is claimed is:

1. A bicycle wheel rim comprising:
a plurality of connectors each having a spoke engaging hole defined therethrough so as to be adapted to engage with a spoke, two protrusions extending from two ends of each connector and a plurality of holes defined through each protrusion, each protrusion having a recess defined in an inside surface thereof so as to be adapted to engage with a tire, and
a plurality of loops extending through the holes of the connectors, wherein said plurality of loops are arranged in a circle.

2. The rim as claimed in claim 1 further comprising two side members connected to two ends of each of the connectors and each side members including two passages, two loops extending through the passages of each side member.

3. The rim as claimed in claim 2, wherein each of the connectors includes two side recesses so as to receive the two side members therein.

4. The rim as claimed in claim 2, wherein each of the connectors includes a hollow body.

5. The rim as claimed in claim 1, wherein each of the connectors includes an aperture defined therethrough.

* * * * *